United States Patent Office 3,514,271
Patented May 26, 1970

3,514,271
**IRON-, NICKEL-, AND COBALT-BONDED
NITRIDE CUTTING TOOLS**
Paul C. Yates, Wilmington, Del., assignor to E. I. du Pont de Nemours and Company, Wilmington, Del., a corporation of Delaware
No Drawing. Continuation-in-part of application Ser. No. 593,001, Nov. 9, 1966. This application July 23, 1968, Ser. No. 746,742
Int. Cl. B22f *3/00, 5/00, 7/00;* C22c *29/00, 31/04*
U.S. Cl. 29—182.5                                    1 Claim

ABSTRACT OF THE DISCLOSURE

Cutting tools comprising a cutting edge of a dense interdispersion consisting essentially of one part by volume of a binder metal such as iron, cobalt, nickel and their alloys and from 3 to 50 parts by volume of a refractory phase consisting essentially of 20 to 95 volume percent of an essential nitride such as titanium, zirconium, hafnium, niobium, or vanadium nitride or their mixtures and from 5 to 80 volume percent of a wear-resistant additive such as alumina, aluminum nitride, or tantalum nitride are exceptionally useful in cutting, shaping and turning metal.

---

This application is a continuation-in-part of my copending application Ser. No. 593,001, filed Nov. 9, 1966, now Pat. No. 3,409,419 which in turn is a continuation-in-part of my then copending application Ser. No. 457,468, filed May 20, 1965, now abandoned, which in turn is a continuation-in-part of my then copending application Ser. No. 371,778, filed June 1, 1964, now abandoned. Application Ser. No. 593,001 is also a continuation-in-part of my then copending application Ser. No. 457,461, filed May 20, 1965, now abandoned, which in turn is a continuation-in-part of my then copending application Ser. No. 371,778, filed June 1, 1964, now abandoned, and my then copending application Ser. No. 371,756, filed June 1, 1964, now abandoned.

This invention relates to refractory compositions and is more particularly directed to aluminum nitride, titanium nitride, vanadium nitride, niobium nitride, zirconium nitride, tantalum nitride, hafnium nitride or a mixture of them, interdispersed with iron, cobalt, nickel or their alloys and with a thermodynamically stable, wear resistant compound. The invention is further directed to the preparation of these interdispersions, to their use as high temperature refractories and cutting tools, and to the preparation of the nitrides utilized in the interdispersions.

The refractory interdispersions of this invention are exceptionally hard and strong, and display outstanding resistance to chemicals, thermal shock, impact, and high temperatures. Accordingly, they can be used in the numerous ways in which refractory materials are conventionally used. Further, in the form of tool bits and cutting tools, these interdispersions display great resistance to wear, great resistance to cratering, and are resistant to welding to work pieces being cut.

The term interdispersion as used herein describes a relationship of the constituents and is meant to include traditional dispersions in which there is a dispersed particulate phase and a dispersant continuous phase. It is also meant to include those mixtures in which there are two or more phases and some or all of them are continuous and interpenetrating as well as simple mixtures in which the phases are particulate or interrupted and homogeneously intermixed.

According to the present invention, I have discovered that a homogeneous interdispersion of fine particles of aluminum nitride, titanium nitride, zirconium nitride, vanadium nitride, tantalum nitride, hafnium nitride, niobium nitride or their mixtures, and a thermodynamically stable, wear resistant compound in iron, cobalt, nickel, or their alloys, in a manner such that the nitride, wear resistant compound and the metal are mutually dispersed in relation to one another, provides a refractory interdispersion possessing exceptional properties.

The metals suitable for use in the interdispersions of this invention are iron, cobalt, nickel, and their alloys in any proportion with one another. Also limited amounts of other conventional alloying agents can be used with these metals as is more fully explained hereinafter.

These metals with the requisite degree of purity can be obtained from commercial sources or they can be prepared in a conventional manner. A suitable method of preparation and purification is fully set forth hereinafter.

The nitrides suitable for use in this invention, sometimes referred to hereinafter as essential nitrides, are the stable, refractory nitrides of groups III, IVB, and VB of the Periodic Table, having free energies of formation of more than 30 kilocalories per mole, per gram atom of nitrogen, at 298° Kelvin, and melting points, decomposition points, or sublimation points in excess of 2000° C.

The essential nitrides can be prepared in any conventional manner or by suitable reactions in molten salts. These nitrides can be used alone, in combination with each other, or in mixtures with other stable refractory compounds. Preparation of the nitrides by reaction in molten salts and suitable refractory additives and the criteria for their selection are described in full hereinafter.

The thermodynamically stable wear-resistant compounds suitable for use in this invention are aluminum and tantalum nitrides, and refractory oxides which have a melting point, decomposition point or sublimation point in excess of 1400° C. and a free energy of formation of more than 80 kilocalories per gram atom of contained oxygen at 298° Kelvin. Such oxides include aluminum oxycarbide and the alumina spinels, as well as chemically stable refractory chromites, silicates and aluminates of zirconium, magnesium, calcium, barium, and strontium and the chemically stable refractory oxides of magnesium, zirconium, hafnium, titanium, chromium, beryllium, zinc, calcium, thorium, barium, strontium, silicon, aluminum, cerium, and the rare earth metals. Most preferred wear-resistant compounds for use in the interdispersions of this invention are tantalum nitride, aluminum nitride and aluminum oxide.

The thermodynamically stable wear-resistant compounds of this invention, referred to hereafter as simply "wear-resistant compounds," can be prepared in a conventional manner, or they can be prepared by in situ reactions incidental to the fabrication of the refractory interdispersions of this invention as will be more fully explained hereinafter. When in situ formation is to be employed for the wear-resistant compounds of this invention, the necessary precursors will be added in their elemental form.

The interdispersions of this invention are prepared by intimately intermixing the nitride to be used, in conjunction with the wear-resistant compound or its precursors, all in the form of very fine particles, with the metal to be used, also in the form of very fine particles, until a homogenous interdispersion is obtained. This homogeneous powder can then be heated and pressed into the desired form and to the desired degree of density. Methods of preparing the powder interdispersions and refractory interdispersions are more fully discussed hereinafter.

The preparation of the powder interdispersions is very important because the outstanding properties of the refractory interdispersions formed therefrom depend to a large degree on the composition of the powder. For example, the homogeneity of the interdispersion of metal, wear-resistant compound and essential nitride, the ultimate particles and crystal size of the nitride, wear-resistand compound, and metal, and the proportional amounts of metal, wear-resistant compound, and nitride are important in achieving the desired properties in the refractory interdispersions of this invention and are largely determined by the powder which is used to form the refractory interdispersion.

The particle size of the metal, wear-resistant compound, and nitride being incorporated into the powder interdispersions of this invention should be as small as is practicable and the preferred maximum particle size is about fifty microns. However, as the desired homogeneity of interdispersion is much easier to attain as the particle size decreases, it is advantageous for the components to have an average particle size of less than ten microns.

If the interdispersed powders are to be used to form very strong refractories like cutting tools and bits, it is preferred that the average particle size of the components be smaller than one micron. Such a particle size adds significantly to the degree of strength, toughness and wear resistance obtainable in the refractory dispersion of this invention and necessary for the use of such compositions as cutting tools.

Refractory interdispersions of this invention can be formed from powdered interdispersions of the nitride, the wear-resistant compound and metal wherein there is from about one to about ninety-nine parts by volume of essential nitride per part of metal. If the amount of nitride in a powder is below one part by volume per part of metal, the hardness of a refractory interdispersion made therefrom is less than that which is desired. Amounts of nitride in the powders above ninety-nine parts per part of metal tend to lessen significantly the impact strength of refractories made therefrom.

A preferred amount of essential nitride in the powder interdispersions of this invention is between 3 and 50 parts by volume per part of metal. Restricting the amount of the nitride to less than 50 parts by volume increases the probability of continuity of the metal within the refractory interdispersion to be formed, and in turn, the probability of outstanding impact resistance, strength and toughness. Conversely, the presence of at least 3 parts of nitride by volume per part of metal in the powder insures a hardness, wear resistance, and chemical resistance, in a refractory interdispersion made therefrom which makes it very desirable for such refractory uses as cutting tools and bits.

The interdispersions of this invention can contain up to about 95% by volume of the wear-resistant compound, based on the volume of the non-metal components. The wear-resistant compound should not be used in amounts in excess of 95% because the interdispersions must contain at least 5% of one of the essential nitrides to insure nitride bonding between the metallic and non-metallic phase.

A preferred amount of wear-resistant compound is from about 5 to about 50% by volume based on the volume of the non-metal components. Such amounts insure the greatest improvement of the oxidation resistance, wear resistance, and resistance to welding, cratering and sticking in cutting tools made from refractory interdispersions of this invention. It is also preferred to use wear-resistant compounds which are very hard and high-melting such as alumina, aluminum nitride and tantalum nitride when the end use of the refractory interdispersion will be cutting tools or bits.

One of the preferred embodiments of this invention is a powder interdispersion in which the nitride particles are separated from each other by particles of the metal. This retards agglomeration or aggregation of the discrete nitride particles during fabrication of refractory interdispersions of the invention.

Another preferred embodiment of this invention is an interdispersion in which discrete nitride particles are uniformly dispersed in the metal which is present as a continuous matrix separating the discrete nitride particles. Such a distribution of the metal ordinarily provides greatly improved mechanical properties in a refractory interdispersion, making it very desirable for uses such as cutting tools and bits. The term discrete as used herein means individually distinct or composed of distinct parts.

Still another preferred embodiment of this invention is a solid interdispersion in which there is a limited degree of interconnection into a continuous matrix, or three-dimensional network, of the nitride and metal phases of the invention. Such a structure is one in which both the nitride phase and the metal phase are co-continuous with an interpenetrating network of each phase being simultaneously present. Such compositions exhibit most outstanding properties when the individual crystallites of the interpenetrating networks, although connected to one another are quite small and distinguishable and thus discrete. The wear-resistant compound can be present in either of these interpenetrating networks or distributed between them.

However, it must be noted that a distribution of the nitride and metal such as described in the three preceding paragraphs is not essential to this invention since outstanding refractories can be produced in the absence of such a state of distribution.

It is desirable that the essential nitride, the wear-resistant compound, and the metal used all possess a high degree of chemical purity. In particular, it is desirable to avoid the presence in any component, of oxygen, nitrogen, boron, silicon, or sulfur either in uncombined form or as compounds having a lower free energy of formation per atom than the corresponding oxides, nitrides, borides, silicides, or sulfides of iron, cobalt, nickel, or their alloys. Other such elements in a form and in amounts which would react with or dissolve in the metal used during fabrication of the refractory interdispersion in such a manner so as to cause undesirable brittleness of the metal, should likewise be avoided. Examples of such impurities which should be avoided are nickel oxide, iron oxide, cobalt oxide, and large amounts of free carbon.

Limited amounts of alloying agents conventionally used with the primary metals iron, cobalt, and nickel, can be used in the interdispersions of this invention, and are preferably retained as a homogeneous solution with the primary metal, having the crystal structure of the primary metal. Amounts of such alloying agents as chromium, tungsten, molybdenum, manganese and others, which would form intermetallic compounds or new crystallographic phases are preferably avoided. Allowable percentages of such agents can be determined according to this criteria, by consulting appropriate phase diagrams in standard metallurgical texts. The solubility of the alloy metals in the primary metals at 600° C., as reflected in such phase diagrams are ordinarily determinative of the preferred allowable amounts of alloying agents. Molybdenum, tungsten and chromium are the preferred alloying elements as they form solid solutions with iron, cobalt, and nickel, thus improving their mechanical properties.

It should be noted, however, that even when alloying agents are present in excess of the above amounts, a ductile metal phase is present so long as the excess is not too large. Thus, for example, a dilution of a metal phase such as iron with amounts of tungsten up to 30% in excess of the solubility, as determined by the above criteria, is not appreciably deleterious to the properties of a refractory interdispersion of this invention.

Therefore, the working limit for the minor amounts of alloying agents which can be present in the primary metals of this invention can be defined as not more than 30 volume percent, based on the total amount of metal, in excess of that amount which (a) is held as a homogeneous solid solution at 600° C. in the primary metal, and (b) has the crystal structure characteristic of the primary metal of this invention. Preferably the amount of alloying agent will not exceed that amount characterized by (a) and (b) above.

When extreme hardness is desired in the metal to be used in the dispersion, elements such as aluminum, titanium, boron, silicon and carbon can be used in small amounts according to conventional metallurgical practices of heat-treating to precipitation harden such metals. Of these elements, aluminum and titanium are preferred for nickel based alloys and carbon is preferred for ferrous alloys. As has been pointed out, the wear-resistant compounds of this invention can be present in this form, prepared by in situ reaction of added metal with the iron, cobalt or nickel bonding metal.

As was previously stated, the nitrides of aluminum, titanium, tantalum, hafnium, zirconium, niobium or vanadium can be used singly or in combination with one another and other refractory additives in the interdispersions of this invention. When used in combinations, it will often be noted that varying degrees of interaction occur. This may include the formation of solid solutions, the formation of mixed nitride compounds, or combinations of these. It will be understood that the purposes of this invention are accomplished both when such interactions take place, and in those instances where the several nitrides remain in their original discrete forms. In terms of the properties of the resulting interdispersions such as wear resistance, mechanical properties, and refractory characteristics, simple mixtures, solid solutions, and mixed nitride compounds all behave in a desirable fashion, imparting outstanding characteristics to the compositions of the invention.

Other chemically stable refractory compounds can be used as additives to partially replace the essential nitrides in the interdispersions of this invention. Such chemically stable nitrides as beryllium nitride, magnesium nitride, boron nitride, uranium nitride, cerium nitride and thorium nitride, can be used to replace a part of the aluminum nitride, titanium nitride, tantalum nitride, vanadium nitride, zirconium nitride, niobium nitride, hafnium nitride, or their mixtures. Such chemically stable carbides as titanium carbide, zirconium carbide, tungsten carbide, molybdenum carbide, chromium carbide, tantalum carbide, and niobium carbide, and such chemically stable borides as the monoborides of titanium and zirconium can also be used.

It is essential, however, that the titanium nitride, aluminum nitride, vanadium nitride, niobium nitride, tantalum nitride, zirconium nitride, hafnium nitride or their mixtures always be present in significant amounts as one of the non-metal components in the interdispersions of this invention. By significant amounts it is meant that the essential nitrides of this invention must be present in amounts of at least 5% by volume of the non-metal phase of the dispersions of the invention, and preferably in amounts greater than 5%. It will generally be noted that the refractory interdispersions of this invention are improved in proportion to the amount of the essential nitrides which are present, at least up to the point at which a continuous phase of nitrides is present in the refractory interdispersions of this invention. The necessary criterion for insuring that the continuous nitride phase will be present is discussed in greater detail hereinafter.

It is also essential, as previously mentioned, that the refractory compounds used as additives not be those which will react with the bonding metal in such a manner so as to embrittle it or which will break down to furnish similar elements whose presence cannot be tolerated for the same reason.

In general, the guideline to be followed in selecting such compounds is that their melting point should exceed 1400° C., while their free energies of formation from the constituent elements should be greater than the free energies of the compounds which would be formed by disproportionation of the additive compound, and reaction of the constituent element with the bonding metal.

For example, tungsten carbide is a satisfactory additive when employed with the nickel or cobalt-bonded compositions of the invention because its free energy of formation substantially exceeds the combined free energies of the nickel or cobalt carbides, and the nickel or cobalt, tungsten alloys that would result from its disproportionation and the reaction of its constituents with nickel or cobalt. Similarly, titanium carbide is a suitable additive for an iron-bonded composition of the invention, since its free energy of formation exceeds the combined free energies of formation of the titanium-iron alloy and iron carbide which would result from its disproportionation and reaction with the iron-bonding metal of the invention. Any standard reference book which discloses the free energies of formation of metal alloys, intermetallic compounds, and refractory carbides, nitrides, and borides can be consulted for the necessary information to apply this criterion as a guide.

It should be noted, however, that small amounts of additives, even including those which may react by disproportionation are not absolutely precluded from the compositions of the invention. When such reactions can occur, however, it is necessary to restrict the amount of any such additives to quantities which are small with respect to the bonding metals of the invention in the particular composition employed. Such restriction prevents the tying up of an amount of the bonding metal which would reduce the strength of the refractory interdispersion and make it undesirably brittle.

The amount of refractory additive to be used in conjunction with, or as partial replacements for, the essential nitride of the invention, will preferably be less than an amount sufficient to form an interpenetrating network of the additive and prevent the formation of a continuous network of the essential nitrides.

Formation of a continuous network does not depend solely on the relative volume fractions of the nitride and the additive, since it is also influenced to a considerable degree by the particle size or crystallite size of the nitride starting powders relative to the starting powders of the additive particles. Thus, if coarse-grained particles of the additive are employed, as for example 10 micron sized particles, in conjunction with very finely divided particles of the essential nitrides of the invention, for example, in the size range of 20 to 100 millimicrons, an interpenetrating network which is essentially bonded together by the nitrodes of the invention will be formed. This is true even though the nitrides are present in amounts as small as 5% of the non-metal phase.

As it is generally preferred to use additives having a particle size of less than a micron, somewhat larger amounts of essential nitrides, on the order of 20% by volume of the non-metal phase, are usually required to achieve the desired continuity. Similarly, if the particle size of the essential nitrides to be used are larger than 20 millimicrons, it can become necessary to use the nitrides in amounts as great as 50% by volume of the non-metal phase, or more to ensure that the preferred continuous ceramic phase bonded by the nitrides of the invention is formed.

It should be noted that there are reasons other than the desirability for forming a continuous nitride phase for preferring, in general, rather large quantities of the essential nitrides of the invention in the most preferred compositions. While the mechanism is not fully understood, it appears that the nitrides of the invention combine to an exceptional degree the properties of resistance to welding or seizing to metals being cut when the compositions of the invention are employed as cutting tips, with the ability to form strong and stable bonds with the bonding metals of the invention. Thus, it is preferred that the essential nitrides be present in amounts greater than 20% by volume of the non-metal phase, and it is most preferred that they be present in amounts in excess of 50% by volume of the non-metal phase.

A general criterion to follow for the formation of the preferred type of structure in which a continuous ceramic network of the nitrides of the invention is formed, is that the product of the volume fraction and the surface area per unit volume of the essential nitrides be approximately equal to, or preferably in excess of, the product of the volume fraction and surface area per unit volume of the additive to be employed. Proper attention to this criterion in selecting compositions will ordinarily result in the preferred type of structure.

Since the structure is also determined to some extent by the rates of crystal growth which occur during fabrication, it is not necessary to apply the above criterion in a completely rigid fashion. In particularly favorable circumstances, when the rate of growth of the nitride network under the fabrication conditions employed greatly exceeds the rate of growth, or the recrystallization rate of the additive to be employed, amounts of the essential nitrides of the invention considerably less than those corresponding to the criterion just discussed may be employed, and the preferred nitride-bonded interpenetrating ceramic network of the nonmetallic phase will still be formed.

PREPARATION OF THE METALS

As stated previously, the metals which can be used in the interdispersions of this invention are iron, cobalt, nickel, and their alloys. A suitable method of preparation of these metals for incorporation into the interdispersions of this invention is hydrogen reduction of the corresponding metal oxide or carbonate at a temperature of from about 600° C. to about 1200° C.

In the preparation of the metals to be used in this invention, it is best to employ as low a temperature as is consistent with a reasonably rapid completion of reduction. This is done to prevent excessive sintering and agglomeration of the particles of metal being formed.

The reduction will be followed by milling operations in an inert liquid medium. In this manner the metal can be obtained in a powder form, preferably having a specific surface area greater than one square meter per gram, which makes it convenient for its subsequent interdispersion with an essential nitride. It is desirable that the grinding media used in the milling operations be constructed of the same metal as that being prepared so that a foreign material is not introduced by attrition of the grinding media, or that they be constructed of extremely wear-resistant material such as cobalt-bonded tungsten carbide to minimize possible contamination.

PREPARATION OF THE NITRIDES

The nitrides to be used in this invention can be prepared by any conventional method, by nitriding the corresponding finely milled hydrides or metallic elements as described in my copending application Ser. No. 457,467, filed May 20, 1965, now abandoned or by a suitable reaction in a molten salt such as described below.

Techniques which have been conventionally employed in the art to prepare refractory nitrides include, for example, reactions between the corresponding metal halides and ammonia, followed by heating to form the nitride. For example, titanium tetrachloride may be reacted with liquid ammonia to form a titanium amidochloride. This can be heated in a stream of ammonia gas to a temperature of approximately 400 to 500° C., whereupon titanium nitrogen chloride will be formed. Further heating at a temperature in the range of 400° C. to as high as is desired, again in the presence of ammonia, nitrogen, or nitrogen plus hydrogen, will result in the formation of the desired titanium nitride. Similar routes are effective in the case of the other nitrides of this invention, such as zirconium nitride, and hafnium nitride.

The nitrides may also be formed by the carbon reduction in the presence of nitrogen of the corresponding metal oxides in a manner which is set forth in the literature. Conventional methods for the preparation of the essential nitrides of this invention are disclosed, for example, in a chapter entitled "Nitrides," by John M. Blocher, Jr., which is Chapter VIII of a book entitled "High Temperature Technology," edited by I. E. Campbell, John Wiley & Sons, N.Y., 1956.

A preferred method of preparing the nitrides of the invention, which results in nitride particles of an average size of less than a micron, is by suitable reactions in a molten salt.

Suitable salts for a salt bath to be used in this reaction can be, for example, the alkali and alkaline earth halides, particularly those which are thermally and thermodynamically stable such as the chlorides and fluorides of sodium, potassium, lithium, calcium, magnesium, and barium.

A second component of the molten salt bath will be a halide or oxide of titanium, zirconium, aluminum, niobium, vanadium, tantalum or hafnium. This component is the source of the metal for the nitride which is to be prepared.

A stoichiometric amount of an alkali or alkaline earth nitride, such as the nitrides of sodium, lithium, calcium, magnesium and the like, is added in small increments to the molten bath. Incremental addition of the nitride avoids a too vigorous reaction. The reaction mixture is vigorously stirred during the nitride addition to insure a complete reaction.

The temperature of the reaction should be between the melting point of the salt mixture and 1200° C. Generally speaking, a temperature of at least 450° C. is desirable while a range of from 600° C. to 1100° C. is most preferred for these reactions.

The product of the reaction can be recovered from the molten salt bath by quenching it and dissolving the salt and reaction by-products in a solvent which shows a high preferential solubility for the salt and the by-products, but which does not substantially or rapidly attack the refractory nitrides. Suitable solvents are distilled water, alcohols, and water mixed with acids, such as hydrochloric and acetic acid.

If desired, the nitride thus recovered can be additionally purified by reduction in an atmosphere of cracked ammonia.

The nitride can be recovered from the molten salt in some instances by distilling off the salts and by-products at a temperature of from 1100° C. to 1400° C. under high vacuum. This procedure avoids exposing the nitride to oxygen, eliminating the need for further reduction with ammonia.

In the event that some aggregation occurs during the synthesis of the nitride, it is possible to disaggregate the particles such as by ballmilling in a nonreactive solvent.

Following the milling, it may be desirable to purify the nitride as by acid treatment, to remove impurities picked up during the milling through attrition of the grinding media. If it is desired to achieve a very low oxygen level, the nitride can be reduced in an atmosphere such as cracked ammonia to remove any oxygen picked up during the purification procedure.

To avoid the necessity for purification, it is preferred to use a grinding media such as the balls, of the same metal as that with which the nitride is eventually to be interdispersed.

PREPARATION OF THE WEAR-RESISTANT COMPOUNDS

The wear-resistant compounds of the invention can be prepared in any of the variety of ways which are well known in the art. Those techniques which furnish the resulting compound in an extremely finely divided form are preferred.

For example, refractory aluminum oxide compounds suitable for use in this invention can be prepared by calcining colloidal dispersions of alumina prepared by precipitation of the hydroxide or hydrous oxide in aqueous solution. They can also be prepared by oxidation or hydrolysis at elevated temperature of a volatile aluminum halide. In general, they can also be prepared by any of a variety of techniques well known in the art for preparing extremely finely divided, preferably colloidal, alumina particles.

Aluminum oxycarbide, suitable for use in this invention, can be prepared by a controlled carbon reduction of aluminum oxide, or by an in situ reaction between finely divided carbon black and almina in the further processing of the compositions of this invention. If this technique of synthesis is employed, it is necessary to heat the constituents at a temperature between 1200 and 1500° C. for a sufficient period of time to eliminate the carbon monoxide reaction byproduct prior to fabricating powder interdispersions containing aluminum oxycarbide into one of the dense compositions of the invention.

In general, however, the wear-resistant compounds can be prepared by the methods conventionally used for preparation of nitrides and oxides with emphasis being placed on obtaining a product of uniformly fine particle size.

PREPARATION OF THE POWDER INTERDISPERSIONS

The interdispersions of the metals with the wear-resistant compounds, the nitrides, and other refractory compounds if desired, in the form of a powder, make up one of the preferred forms of this invention. The titanium nitride, aluminum nitride, vanadium nitride, niobium nitride, zirconium nitride, tantalum nitride, hafnium nitride or their mixtures, the wear-resistant compounds, and such other refractory compounds as may be desired, can be interdispersed with the metal powder in any convenient manner such as by mixing in a hydrocarbon solvent in a colloid mill or a ballmill. Preferably the hydrocarbon solvent will be one of sufficiently high boiling point and flash point to avoid a fire hazard. Ballmilling times of from 24 to 500 hours have been found satisfactory.

Since the nitride constituent of the invention is difficult to purify, it is desirable to employ grinding media, such as the balls, of the same metal as that with which the nitride is being interdispersed, or of material which is extremely resistant to attrition such as cobalt-bonded tungsten carbide. This insures that foreign materials will not be introduced as a result of the attrition of the grinding media. The mill can be one which is coated with an elastomeric material such as neoprene, which is not softened or attacked by the grinding fluid. Milling conditions, such as the volume loading of the mill and the rate of rotation, should be optimized as hereinafter illustrated in the examples.

After milling the mixture to homogeneity, the grinding fluid can be removed by washing with a suitable solvent such as hexane and drying under vacuum. The milled powders absorb water or oxygen rapidly and must be kept out of contact with air and moisture. The powders of this invention are therefore handled in an inert atmosphere but if contamination occurs, the powders can be reduced to remove such impurities. This reduction will preferably be performed below 1000° C. with very dry pure hydrogen.

The average size of the particles can readily be determined by examination of the interdispersed powder using a light microscope for larger particles and an electron-microscope for smaller particles. By average particle size is meant the number average of the particle diameters. In the preferred powder interdispersions the surface area per cubic centimeter of solids is from about 3 to 180 square meters. The surface area per cubic centimeter can be determined by multiplying the density of the solids of the interdispersion by the specific surface area as measured by standard nitrogen absorption techniques.

PREPARATION OF REFRACTORY INTERDISPERSIONS

The interdispersions of the metals with the nitrides, the wear-resistant compounds, and such other refractory compounds as may be desired, in the form of a solid, make up another preferred form of this invention. A representative method for forming these interdispersions is by pressing and heating the powder interdispersions to nearly theoretical density. The pressing and heating may be done sequentially as in cold pressing and sintering, or it may be done simultaneously as in hot pressing, hot extrusion, hot rolling, hot forging, or hot coining. Pressing and heating can be conducted in the presence of a nitrogen atmosphere if desired. The preferred method of fabrication is by hot pressing.

The pressing temperature will depend on the amount of metal employed, its state of subdivision, and the composition and state of subdivision of the nitrides and wear-resistant compounds. Generally speaking, the temperatures will be at least 6/10 of the melting point, expressed in degrees Kelvin, of the metal component and should be at least 1000° C. and not more than 2000° C. The larger the amount of nitride being used, and the lower the pressure being employed, the higher should be the fabrication temperature. When hot pressing is employed, heat and pressure can be applied simultaneously or sequentially, but it is preferred to delay application of the pressure until the goal temperature is reached. It is also preferred to use a temperature of from about 1350° C. to about 2000° C.

The time the compact spends at the highest temperature used and under the full pressure employed will vary according to the temperature and method of fabrication used and the composition and state of interdispersion. Generally, the time will vary from a few seconds in hot extrusion to one to 30 minutes in hot pressing and from 10 minutes to several hours when fabrication is by cold pressing and sintering.

The pressure employed will also vary according to the temperature and method of fabrication used and the composition and state of interdispersion, but will generally range from 500 pounds per square inch to more than 6000 pounds per square inch.

The applicable combinations of pressing conditions will hereinafter be more completely illustrated in the examples.

An alternate method of interdispersing the components with one another, prior to preparation of a solid interdispersion, is to precipitate the metal to be used on previously prepared fine particles of the nitride to be used, and of the wear-resistant compound to be used. The metal can be precipitated, for example, as a hydrous oxide or hydrous metal carbonate and the resulting homogeneous mixture can then be reduced in an atmosphere rich in both nitrogen and hydrogen, such as cracked ammonia. This allows the reduction of the oxides which are present without effecting a change in the nitrides being used.

Similarly, an oxide precursor of the nitride to be used, such as titanium dioxide as a precursor for titanium nitride, can be coprecipitated with the hydrous metal carbonate or hydrous metal oxide and the desired wear-resistant compound. Sufficient carbon black can then be mixed with the mixed oxide coprecipitate to reduce the nitride precursor, and the whole composition can then be heated to a temperature of from 1100° C. to 1500° C. in cracked ammonia to produce a nitride, metal, wear-resistant compound composition of this invention. This composition can be ballmilled, if desired, to reverse any aggregation which may have occurred as a result of the heating and reduction.

After a refractory interdispersion has been prepared, the particle sizes of the components can be determined by making a metallographic section, etching the section with an appropriate chemical, and examining the surface with a microscope, using an optical microscope or an electronmicroscope, as is appropriate. Where an electronmicroscope is to be used, a conventional carbon or plastic replica of the surface is made first and the measurements are then made on the replica.

The average particle size of the components of a refractory interdispersion of this invention should be less than 50 microns. In the more preferred embodiments of this invention the average particle size will be less than 10 microns, and in the most preferred embodiments of the invention the average particle size will be less than one micron.

The nature of the interdispersion of the nitride and the wear-resistant compound with the metal and the dimensions of the metal in the refractory interdispersions of this invention will be a function of the fabrication conditions and the volume fraction employed as well as the nature of the starting material. Some clumping or aggregation of nitride particles will occur, but as mentioned previously, one of the preferred embodiments of the invention is that in which most of the nitride particles are separated from each other by some of a continuous metal matrix giving a homogeneous and uniform interdispersion of discrete nitride particles.

More specifically, it is desired that the homogeneity of interdispersion be such that the distribution of the nitride and metal in the refractory interdispersion is on a 1000 square micron scale, and more preferably on a 100 square micron scale. By this is meant that a metallographic or an electron micrographic scan, as conventionally used in metallurgy to examine the structure of alloys, will show both the nitride and metal present within a square region no greater than 32 microns on edge, and preferably no greater than 10 microns on edge. Moreover, in the most preferred embodiment of this invention each square region 10 microns on edge which is examined will exhibit substantially the same structural characteristics as every other such region in the interdispersion within conventional statistical distribution limits.

Also as stated previously one of the most preferred embodiments of this invention, is a refractory interdispersion in which there is a cocontinuous network of very finely divided, discrete crystallites of both the metallic phase and of the non-metallic phase, in which the constituents of each phase have crystallite sizes or particle sizes less than 1 micron, and in which the essential nitrides of the invention comprise the primary bonding units of the non-metallic phase.

The preesnce of a continuous phase of the metal in preferred refractory interdispersions of this invention can be most simply determined by measuring the electrical resistivity of the interdispersion. Since the refractory compounds used in this invention have a higher electrical resistance than do iron, cobalt, nickel, or their alloys, if the refractory compounds are distributed so as to interrupt the continuity of the metal, the electrical resistivity of the refractory interdispersion will be from 10 to 100-fold higher than if the metal is continuous. Conversely, if one of the metals is distributed as a continuous phase throughout a refractory interdispersion of this invention, the electrical resistivity of the interdispersion will be inversely proportional to the volume fraction and thickness of the continuous pathway of the metallic constituent. Appreciable continuity of the metal throughout a refractory interdispersion of this invention is indicated by a specific electrical resistivity of less than about one ohm centimeter; in the preferred refractory interdispersions the specific electrical resistivity will be less than about 0.05 ohm centimeter; and in the most preferred refractory interdispersions the specific electrical resistivity will be less than 0.1 milliohm centimeter.

It is usually possible by inspection of suitably prepared metallographic specimens of the compositions of the invention to determine and demonstrate which of them contain the preferred interpenetrating nitride network. If the crystallite size of the various components in the refractory interdispersion is of the order of a micron or larger, the existence of such a network may be directly observed in an optical microscope, using a magnification of 1000 or 2000-fold. If some or all of the various component crystallites are substantially smaller than a micron in size, the refractory interdispersion can be examined by electron micrograph replica techniques, using conventional procedures.

The refractory interdispersions of this invention have a density in excess of 90% of the theoretical density and preferably in excess of 95% of the theoretical density. Those refractory interdispersions which are to be put to such uses as cutting tools most preferably have a density in excess of 98% of the theoretical density and are substantially free from pores when examined by metallographic methods. The theoretical density is calculated by assuming that the specific volumes of the individual components are additive.

The density of the refractory interdispersions of this invention can be determined by any technique for determining the simultaneous weight and volume of the composite. Most simply the weight can be determined with a sensitive analytical balance and the volume can be determined by mercury or water displacement.

It should be understood that the previously discussed aspects of the structure, purity, density, homogeneity, and metal continuity of the refractory interdispersions of this invention are each contributing factors toward achieving improved properties in such interdispersions. However, the most outstanding results are obtained when all of the characteristics are simultaneously present. Such refractories, in the form of cutting tools or bits, constitute the most preferred embodiment of this invention.

Such a refactory composite is one in which discrete nitride particles, discrete particles of the wear-resistant compounds and discrete particles of other refractory compounds if used, having an average size of less than a micron, are homogeneously interdispersed as a co-continuous phase with a three-dimensional network of iron, cobalt, nickel, or their alloys so that the uniformity of distribution is on a scale of less than 100 square microns. The average size of the metal crystals in the composite is less than one micron and continuity of the metal is such that the composite has an electrical resistivity of less than 0.1 milliohm centimeters. The amount of the nitride, and additive refractory compounds, if used, is from 3 to 50 parts by volume par part of metal, the amount of the wear-resistant compound is from 5 to 50% by volume of the non-metal phase, and the density of the composite is in excess of 99% of the theoretical density. The most preferred metals for such a composite are cobalt and an alloy of nickel with 15 weight percent molybdenum. Among the preferred mixtures of refractory compounds would be one containing about 50 to 75% by volume, titanium nitride, about 15 to 25% by volume aluminum nitride, or alumina, and about 8 to 18% by volume tungsten carbide, based on the volume of the total refractory phase.

The refractory interdispersions of this invention are hard, strong, thermal shock-resistant and corrosion-resistant. They display high electrical and thermal conductivity and demonstrate superior resistance to erosion. These properties make them particularly useful for structural applications, for corrosion and erosion-resistant chemical process equipment, for high temperature electrodes, for dies, thread guides, bearings and seals.

However, as stated before, the refractory interdispersions of this invention are most particulraly useful as tool bits in cutting, grinding, shaping, drilling, and punching very hard metal or alloys at high speeds. This is due to their great impact strength and thermal conductivity and their unusual resistance to thermal shock, wear, cratering and welding.

In order that the invention may be better understood, the following illustrative examples are given, wherein parts and percentages are by weight unless otherwise indicated.

Example 1

Forty parts of a finely divided form of gamma alumina, having a surface area of about 200 m.$^2$/g., and consisting of relatively non-aggregated spheres, are mixed with 400 parts of aluminum flake pigments having an oxygen content of 1.43%. To this mixture is added 5.5 parts of a dispersion of lithium metal in paraffin wax, the content of lithium metal being approximately 37%. These are loaded into a steel ball mill which is filled to 40% by volume with steel balls. To this are added a sufficient amount of "Soltrol" 170, an isoparaffinic hydrocarbon solvent having a flash point of 185° C., to cover the steel balls. The loading of steel balls is 9288 parts and 1275 parts of the high boiling hydrocarbon oil are used. The mill is closed and rotated on rollers running at a speed of 60 r.p.m. for a period of four days. A sample of about 150 parts of this material is separated from the steel balls and the hydrocarbon solvent and loaded into a carbon boat and placed in an alumina tube, which, in turn, is placed in an electric furnace. The temperature is raised to 1450° C. while maintaining an atmosphere of cracked ammonia and N$_2$ in the tube over a period of about 3 hours, and held at that temperature for 2 hours.

The product at this stage consists of a very finely divided aluminum nitride powder having a surface area of 6.6 m.$^2$/g. and a crystallite size by X-ray line broadening of 210 m$\mu$.

After determination of the surface area, this material is placed back into the carbon boat and fired for an additional 8 hours under a nitrogen atmosphere at 1450° C. A chemical analysis shows it to contain 65% aluminum, 2.43% oxygen, and 30.72% nitrogen. Its surface area is 2.0 m.$^2$/g. X-ray line broadening measurements show this material to consist of aluminum nitride having a crystallite size of approximately 265 millimicrons.

Thirty-one and nine tenths parts of this aluminum nitride powder and 1.53 parts of a 1 micron size, finely-divided, powder mixture consisting of 99 weight percent metallic iron and 1% metallic boron are milled in a rubber-lined steel ballmill filled to 40% of its volume with ¼″ diameter—¼″ long cylindrical rods of tungsten carbide—6% cobalt, and also containing 270 parts of an isoparaffinic hydrocarbon oil having a flash point of 185° F. This mill is placed on rubber-lined rollers and rotated at a speed of 60 r.p.m. for a period of 48 hours.

The oil and iron-boron-aluminum nitride intimately mixed, finely divided powders are separated from the tungsten carbide-cobalt rods, and the mixed powder separated from the oil by decantation. The powder is then washed six times with 660 part portions of normal hexane which completely free it of the hydrocarbon oil. The resulting finely divided dispersion is dried overnight in a vacuum oven. Chemical analysis shows this powder to consist of 49 parts by volume of aluminum nitride per part by volume of a metal which is 99 percent iron and 1 percent boron.

Fifteen parts of this powder are placed in a cylindrical carbon mold and hot pressed in an induction-heated, vacuum, hot press under a pressure of 4000 p.s.i. at a top temperature of 2000° C. and with a holding time of one minute under these conditions. The sample is cooled, removed from the press, and cut into test pieces for evaluation of its density and mechanical properties. Cutting is performed by a thin diamond saw blade, using a wafer cutting machine for this purpose.

It is found that the transverse rupture strength of this refractory interdispersion is 51,300 p.s.i., its hardness on the Rockwell A scale is 85.2, and its impact strength is 5.1 ft. lbs./in.$^2$. Its density is 3.31 g./cc., which represents 99% of the theoretical density to be expected of this composition, assuming that the specific volume of the various constituents is additive.

A cutting tool insert is machined from this refractory interdispersion and is found to be an exceptional cutting tool which shows very little wear on 4340 grade steel using a depth of cut of ⅟₁₆″ and a cutter speed of 1500 surface feet per minutes. The edge (or flank) wear and the cratering tendencies of this composition are extremely low.

Example 2

Twenty-nine and four tenths parts of the aluminum nitride powder of Example 1 and 7.4 parts of a 1 micron particle size tungsten carbide powder, along with 4.4 parts of a finely divided mixture of cobalt and boron powders in the ratio of 99.5 parts of cobalt to 0.5 part of boron are mixed and milled, using the equipment and conditions described in Example 1.

The resulting interdispersion is hot pressed at a temperature of 1800° C. under a pressure of 4000 p.s.i., with a holding time under these conditions of 5 minutes.

The resulting refractory interdispersion of the invention consists of 19 parts by volume of a refractory phase per part by volume of metal. The refractory phase in turn contains 95 volume percent aluminum nitride and 5 volume percent tungsten carbide. The metallic phase is made up of an alloy of 99.5 percent cobalt and 0.5 percent boron.

This refractory is cut up into test specimens and evaluated as described in Example 1. It has the following properties: The transverse rupture strength is 48,700 p.s.i., its Rockwell A hardness is 78.0, and its impact strength is 5.4 ft. lbs./in.$^2$. Its density is 3.9 g./cc., which is 95% of the theoretical density of 4.12 g./cc., which can be calculated by assuming that the volumes of the constituents are additive.

Example 3

Twenty-seven and eight tenths parts of the aluminum nitride in Example 1, 2.5 parts of a 10 micron size powder of magnesium nitride, and 8.68 parts of a 10 micron size powder mixture of nickel metal and boron metal in the weight ratio of 99 parts of nickel to 1 part of boron are milled as described in Example 1.

After recovery of the interdispersion and purification as described in Example 1, 18 parts of the intimate powder mixture is hot pressed in a carbon mold, using a pressure of 500 p.s.i., a temperature of 1650° C., and a holding time of 15 minutes.

The refractory interdispersion thus formed contains about 8.55 parts by volume of aluminum nitride and about 0.45 part by volume of magnesium nitride per part by volume of an alloy of 99 percent nickel, 1 percent boron. The measured density is 3.65 g./cc., which is 96% of the theoretical density to be expected for this composition.

The refractory interdispersion is cut up and tested as described in previous examples. It has a rupture strength of 50,800 p.s.i., an impact strength of 6.4 ft. lbs./in.$^2$, and a Rockwell A hardness of 77. This refractory is useful as a high temperature structural material showing good oxidation resistance, strength, wear, and erosion resistance at temperatures even up to 1000° C.

Example 4

Twenty-seven and seven tenths parts of a 40 micron size aluminum nitride prepared by sintering and recrushing the aluminum nitride of Example 1, and 13.34 parts of a 50—50 ratio mixture of less than 50 micron particle size nickel and cobalt metal powders are milled, recovered from the mill, purified and dried as described in Example 1. Twenty parts of this interdispersion are hot pressed in a cylindrical carbon mold at a temperature of 1300° C., using a pressure of 6000 p.s.i., and held under these conditions for 30 minutes.

The resulting refractory intedispersion of the invention contains about 5.67 parts by volume of aluminum nitride per part by volume of a nickel-cobalt alloy with a ratio of 50 parts of nickel to 50 parts of cobalt. The density of this composition is 3.83 g./cc., which is 93% of the theoretical density of 4.10 g./cc. to be expected for it.

This refractory is cut up and tested as in previous examples, and shows the following properties: Its transverse rupture strength is 48,400 p.s.i., its impact strength is 6.6 ft. lbs./in.$^2$ and its hardness on the Rockwell A scale is 69.3. This refractory interdispersion shows good high temperature resistance to molten aluminum, and is useful for preparing crucibles, pouring spouts and other hardware for handling molten aluminum and molten aluminum alloys.

Example 5

Eighteen and three tenths parts of the aluminum nitride of Example 1, and 7.5 parts of a 300 millimicron particle size, alpha alumina are mixed with 9.85 parts of a 500 millimicron powder of iron, and 11.11 parts of a 500 millimicron power of cobalt. These are milled, recovered from the mill, and purified as directed in Example 1. Twenty-three parts of the resulting interdispersion of iron, cobalt, aluminum nitride and alumina are hot pressed for 30 minutes at 1350° C. under a pressure of 6000 p.s.i.

The refractory interdispersion thus formed is found to contain 2.25 parts by volume of aluminum nitride and 0.75 part by volume of $Al_2O_3$ per part by volume of an iron-cobalt alloy containing iron and cobalt in a 50—50 volume ratio. Upon being cup up and tested as directed in Example 1, the refractory is found to have a density of 4.40 g./cc., which is 94% of the theoretical density of 4.68 g./cc. to be expected of this composition. Its transverse rupture strength is 54,300 p.s.i., its Rockwell A hardness is 70, and its impact strength is 8.6 ft. lbs./in.$^2$.

Metallographic examination of this refractory shows an interdispersion of aluminum nitride and alumina in an iron-cobalt alloy. The average particle size of the metal crystals ranges from 0.6 to 0.9 micron and the average particle size of the aluminum nitride and alumina is about 0.5 micron.

The metallographic examination of the interdispersion further shows that both the iron-cobalt alloy and the aluminum nitride are present within a square region ten microns on edge, and of ten such one hundred square micron regions examined, nine exhibit the same structural characteristics.

The electric resistivity of the interdispersion is about one ohm centimeter. This low value of electrical resistivity indicates that the continuity of the metal in this refractory dispersion is not interrupted by aluminum nitride or alumina.

Example 6

Twenty-one and seven tenths parts of the aluminum nitride of Example 1, 14.05 parts of a 10 micron particle size powder of titanium monoxide, 2.66 parts of finely divided iron metal powder, and 1.14 parts of finely divided chromium metal powder are mixed. They are milled as described in Example 1, and the powder is recovered and purified as described in Example 1. Twenty grams of this interdispersion are hot pressed in a cylindrical carbon mold at a temperature of 1900° C under a pressure of 4000 p.s.i., holding these conditions for 1 minute.

The resulting refractory interdispersion of the invention consists of about 13.3 parts by volume of aluminum nitride and 5.7 parts by volume of titanium monoxide per part by volume of an alloy which is 70 percent iron and 30 percent chromium. This refractory is cut up and tested as described in Example 1, and it is found to have a density of 3.88 g./cc., which is 98% of the theoretical expected density of 3.96 g./cc. for this composition. Its transverse rupture strength is 52,600 p.s.i., its Rockwell A hardness is 84.0, and its impact strength is 5.8 ft. lbs./in.$^2$. This refractory is an excellent cutting tool, both on steel and cast iron, showing very little wear, cratering, or welding, even at cutting speeds up to 1500 surface feet per minute, so long as the depth of cut is relatively light, such as $\frac{1}{16}''$.

Example 7

Nineteen and five hundreths parts of the aluminum nitride of Example 1 and 17.1 parts of a 1 micron particle size powder of titanium nitride, 6.76 parts of a finely divided nickel metal powder, and 1.69 parts of a finely divided chromium metal powder are mixed together. They are milled, recovered from the mill, purified, and dried as described in Example 1. Twenty parts of this interdispersion are pressed in a hardened steel mold, under a pressure of 10,000 p.s.i., to give a green billet. This billet is sintered for 4 hours at a temperature of 1325° C. in an alumina tube maintained under a high vacuum.

The resulting refractory interdispersion contains about 5.85 parts by volume of aluminum nitride and about 3.15 parts by volume of titanium nitride per part by volume of an alloy which is 80 percent nickel and 20 percent chromium.

This refractory interdispersion has a density of 4.03 g./cc., which is 90.5% of the theoretical expected density of 4.45 g./cc. Its rupture strength is 63,000 p.s.i., its hardness 60.7 on the Rockwell A scale, and its impact strength 11.1 ft. lbs./in.$^2$.

Example 8

Fifteen and sixty-five one hundredths parts of the aluminum nitride of Example 1, 23.40 parts of a finely divided (approximately 1 micron size particle) powder of tungsten carbide, 30.8 parts of finely divided nickel metal powder, and 5.44 parts of finely divided chromium metal powder are mixed together. Milling, recovery, purification, and drying of this powder are accomplished as directed in Example 1. Thirty parts of this material are hot pressed in a cylindrical carbon mold at 1400° C., using a pressure of 4000 p.s.i. and a holding time of 30 minutes.

The results refractory interdispersion of the invention consists of about 1.12 parts by volume of aluminum nitride and about 0.38 part by volume of tungsten carbide per part by volume of an alloy which is 85 percent nickel and 15 percent molybdenum.

Samples are cut and tested as illustrated in Example 1, and the following properties are observed: The transverse rupture strength is 64,000 p.s.i., the Rockwell A hardness is 66.3, and the impact strength is 11.2. The density of this body is 6.97 g./cc., which is 94% of the theoretical density of 7.43 g./cc.

Example 9

Twelve and seven tenths parts of the aluminum nitride of Example 1, 18.3 parts of a finely divided zirconium nitride powder (having particles smaller than 10 microns), 33.4 parts of finely divided cobalt metal powder, and 5.9 parts of finely divided tungsten metal powder are mixed. After milling, recovery, purification and drying as described in Example 1, 28 parts of this interdispersion are pressed in a hardened steel die under a pressure of 10,000 p.s.i. The resulting green billet is then inserted in an alumina tube in an electric furnace, and heated to 1600° C. under a high vacuum, and held at this temperature for 1 hour.

The resulting refractory interdispersion of the invention consists of 1.12 parts by volume of aluminum nitride and 0.74 part by volume of zirconium nitride per part by volume of a cobalt-tungsten alloy having a ratio of 85% cobalt to 15% tungsten.

The density of this refractory is 6.48 g./cc., which represents 92% of the 7.04 g./cc. theoretically expected of it. Its rupture strength is 55,500 p.s.i., its Rockwell A hardness is 63.8, and its impact strength is 10 ft. lbs./in.²

Example 10

Twenty-nine and three tenths parts of the aluminum nitride of Example 1 and 4.94 parts of a finely divided colloidal powder of thoria having a particle size of approximately 15 millimicrons, are mixed with a finely divided powder mixture of the following metals: 3.84 parts of cobalt, 0.87 part of chromium, 0.43 part of tungsten, and 0.04 part of boron. This composition is milled as described in Example 1, and recovered from the mill, purified, and dried, in the same fashion. Eighteen parts of the resulting intimate powder interdispersion of the various metals and the aluminum nitride and thoria are hot pressed at a temperature of 1750° C. under 4000 p.s.i. pressure, and held under these conditions for a period of 1 minute.

The resulting refractory interdispersion contains about 18.05 parts by volume of aluminum nitride and about 0.95 part by volume of thoria per part by volume of a complex metallic alloy which has the composition of: 69% cobalt, 20% chromium, 10% tungsten, and 1% boron. The density of this interdispersion is 3.83 g./cc., which is 99.5% of the theoretical density of 3.85 g./cc. to be expected for this composition.

The transverse rupture strength of this composition is 70,000 p.s.i., its Rockwell A hardness is 89.5, and its impact strength is 6.2 ft. lbs./in.².

This refractory is an excellent cutting tool for high speed cutting on both steel and cast iron, showing very little wear, cratering or welding. It can operate at speeds up to 1500 surface feet per minute on either of these metals for a depth of cut of up to 1/16".

Example 11

Thirty-one parts of the aluminum nitride of Example 1, 3.67 parts of finely divided iron metal powder, 0.04 part of a colloidally subdivided carbon black, and 0.04 part of finely divided boron metal powder are mixed. They are milled, recovered from the mill, purified and dried as described in Example 1. Seventeen parts of the resulting intimate mixture are hot pressed at a temperature of 2000° C. under a pressure of 4000 p.s.i., using a holding time of 5 minutes. The resulting refractory interdispersion contains 19 parts by volume of aluminum nitride per part by volume of a metal alloy consisting of 98 percent iron, 1 percent carbon, and 1 percent boron.

Samples are cut from this refractory interdispersion and tested as described in Example 1, and it is found that the density of the interdispersion is 3.48 g./cc., which corresponds with the theoretical density to be expected for it. The transverse rupture strength is 80,000 p.s.i., its Rockwell A hardness 90, and impact strength 7.0 ft. lbs./in.². This refractory is an excellent cutting tool for light finishing cuts on cast iron, steel, and other ferrous alloys showing almost negligible cratering and welding tendencies, and having an exceedingly low wear rate.

Example 12

Twenty-nine and three tenths parts of the aluminum nitride of Example 1, 7.6 parts of finely divided nickel metal powder, and 0.4 part of finely divided aluminum metal powder, are milled, purified, and dried as described in Example 1. Twenty grams of this interdispersion are hot pressed at a temperature of 2000° C., under a pressure of 4000 p.s.i. and a holding time of 5 minutes.

The resulting refractory interdispersion contains 9 parts by volume of aluminum nitride per part by volume of a metal alloy consisting of 95% nickel and 5% aluminum.

The density of this interdispersion is 3.73 g./cc. which is the theoretical density to be expected of it. Its transverse rupture strength is 69,000 p.s.i., its hardness is 89.2 on the Rockwell A scale, and its impact strength is 7.5 ft. lbs./in.².

This refractory is an excellent cutting tool for ferrous metals, aluminum, copper, and bronze, showing very little wear even at quite high speeds of operation. In particular, it is highly resistant to welding and cratering.

Example 13

Two hundred and twenty and four tenths parts of the aluminum nitride of Example 1 are milled in a ballmill for a period of 500 hours with 8.9 parts of a 250 millimicron particle size powder of nickel metal. Recovery of the intimately mixed powder, its purification, and drying are as described in previous examples.

Fifteen parts of the resulting submicron-size, intimately mixed powders are hot pressed at a temperature of 1375° C. under a pressure of 4000 p.s.i., with the pressure being applied at the maximum temperature. The pressure is maintained for a period of 5 minutes, the sample cooled and removed from the press. The resulting refractory body is an interdispersion of 75 parts by volume of aluminum nitride with 1 part by volume of nickel metal. The density of this refractory interdispersion is 3.33 g./cc., which is the theoretical density to be expected for this composition.

This refractory is useful as a cutting tool, showing very low wear and cratering, even at exceptionally high speeds on steel and cast iron. It is also useful as a high temperature wear resistant and corrosion resistant body, being little affected by molten aluminum, or highly abrasive use conditions.

Example 14

Three hundred and twenty-two and seven tenths parts of the aluminum nitride of Example 1 and 7.86 parts of a submicron particle size iron metal powder are milled, recovered from the mill, purified, and dried as described in Example 13. A sample is hot pressed as described also in Example 13.

The resulting refractory body of the invention is an interdispersion of 99 parts by volume of aluminum nitride with 1 part by volume of iron metal, and has a density of 3.31 g./cc., which is within experimental error of the theoretical density for this composition. This composition performs quite satisfactorily as a cutting tool particularly when employing light cuts at extreme speeds, as, for example, in excess of 1000 surface feet per minute on steel, cast iron, and other metals.

Example 15

This example describes the preparation of particulate titanium nitride by a reaction between titanium trichloride and calcium nitride in a bath of molten calcium chloride. It further describes the preparation of a refractory dispersion of iron, aluminum nitride and titanium nitride.

The apparatus used in preparing the titanium nitride consists of a cylinder 4" in diameter and 11" high, fabricated from 1/16" sheet "Inconel" (80% nickel, 13% chromium, 7% iron). The cylinder is contained in a 1/4" wall "Duralloy" (65% iron, 20% chromium, 15% nickel) pot provided with a flange to which is bolted a tightly fitted head. Two taper joints are attached to the head. Retort shaped glass bulbs are inserted in the taper joints and the solid powder reactants are dispensed from these bulbs by rotating them in the joints so that the powder spills over into the reactor. A stirrer, made from 1/2" "Inconel" tube with flat blades of "Monel" welded to the tube, enters the reactor via an asbestos packed bearing. The temperature in the reactor is recorded by means of a thermocouple inserted inside the hollow stirrer shaft. An electrically heated "Calrod" furnace surrounds the pot, the temperature of the furnace being recorded by means of another thermocouple.

Five hundred parts of anhydrous calcium chloride are charged to the reactor and the air in the system is displaced by passing argon, previously gettered over finely divided titanium metal at 800° C., into the reactor, the gas exit being connected to a bubbler. The calcium chloride is melted and the melt brought to 875° C. with good agitation by the mechanical stirrer. Aliquots of the mixed reactants consisting of 15.43 parts of titanium trichloride and 13.83 parts of calcium nitride are charged at 5 minute intervals to the reactor by manipulating the addition bulb and controlling the rate of addition by observing the heat evolved, as recorded by the stirrer thermocouple. The temperature is maintained in the range of 875 to 925° C. during the reaction, the addition being completed over a period of 80 minutes. A total of ten aliquots are added during this time. The melt is kept at 875 to 900° C. with stirring, for a total period of one hour. Then, after raising the stirrer from the melt, the salt is allowed to cool to room temperature under argon. The solidified salt cake is broken up and pulverized.

The crushed salt cake is stirred with ice water, until the calcium chloride is dissolved. The product is then washed until it is free of chloride ion by suspending in distilled water and centrifuging through a Sharpless Supercentrifuge. This requires five washes, using 10,000 parts of water per wash. After the product is free of chloride ion, it is dried in a vacuum oven to give a very finely divided titanium nitride colloidal powder. 118 parts representing 96% of the theoretical yield for this reaction are recovered. Examination of the product by X-ray diffraction indicates it to be titanium nitride, and chemical analysis shows that it contains about 1% oxygen as a major impurity, along with traces of iron, chromium, and nickel in the parts per million range, presumably originating from the "Inconel" equipment used for the synthesis.

X-ray line broadening measurements and nitrogen surface determinations indicate the crystal size of the titanium nitride crystals to be approximately 55 millimicrons.

Twenty-six and six tenths parts of the titanium nitride are loaded in a rubber-lined steel ballmill containing 6.85 parts of aluminum nitride and 23.40 parts of a stainless steel powder, having a particle size of about 10 microns and a composition of 74% iron, 18% chromium, and 8% nickel. This is milled under 270 parts of hydrocarbon oil, using 2600 parts of stainless steel balls for 24 hours.

The resulting intimate interdispersion containing about 1.63 parts by volume of titanium nitride and about 0.7 part by volume of aluminum nitride per part by volume of stainless steel is recovered in the fashion described in previous examples.

Twenty parts of this interdispersion are cold pressed in a hardened steel die under a pressure of 10,000 p.s.i. and this compact is sintered at a temperature of 1900° C. for one hour.

The resulting refractory interdispersion of the invention has a rupture strength of 70,000 p.s.i., an impact strength of 12 ft. lbs./in.$^2$, and a density of 5.3 g./cc. This represents 92.5% of the theoretical density for this composition.

This refractory exhibits excellent corrosion and erosion resistance to a variety of chemicals, and is also useful as a high temperature structural material. In addition, it is useful as a cutting tool for machining cast iron.

Example 16

One hundred and eighteen parts of finely divided titanium nitride, 24 parts of finely divided cobalt, and 8.3 parts of finely divided aluminum nitride are placed in a one quart steel ballmill containing 350 parts of a high boiling hydrocarbon solvent and 3500 parts of ¼" long, ⅛" diameter cylindrical rods of 94% tungsten carbide and 6% cobalt. The mill is then rotated at 60 r.p.m. for a period of 64 hours. The mixture is separated from the oil by decantation and the remaining oil is then removed by washing in hexane in a nitrogen atmosphere. The hexane is then removed by vacuum distillation. The resulting powder contains about 8 parts by volume titanium nitride and about 1 part by volume aluminum nitride per part by volume of cobalt.

Under a nitrogen atmosphere, 23 parts of this powder is placed in the cavity of a cylindrical carbon mold which can be inserted in the hot zone of an induction coil and held there by two carbon rams which are in turn connected to the platens of a hydraulic press. The mold and rams are enclosed through vacuum tight seals within a water-cooled cylindrical steel shell which is evacuated by a vacuum pump. Temperature control of this equipment is effected by means of a radiation pyrometer, the output of which operates a controller, which in turn controls the power supply to the induction furnace. After evacuation of the furnace, the temperature of the carbon mold is increased to 1500° C., and a pressure of 4000 p.s.i. applied. The temperature is then raised to 1600° C., still maintaining the pressure at 4000 p.s.i. and the sample is held at this temperature for 2 minutes, after which the power is shut off and the sample removed from the furnace cavity.

The resulting disc is cut into pieces for testing its transverse rupture strength, its Rockwell A hardness, its density and its performance as a cutting tool for cutting metals and alloys. The average transverse rupture strength obtained is 178,000 p.s.i., its Rockwell A hardness is 91.7 and its density is 5.70 g./cc.

Part of the disc is fashioned into a standard cutting tool insert and its wear rate and crater depth determined on a high speed lathe. The depth of cut is 0.050", the feed is 0.010" and the speed is 1000 surface feet per minute. These conditions are referred to as the A conditions. The metal used is 4340 steel.

After three minutes cutting time under the A conditions, the wear on the flank of this cutting tool is only 13 mils and the crater depth is 1 mil.

Example 17

One hundred-seven and one-half parts of finely divided titanium nitride, 25.2 parts of finely divided cobalt, and 17.3 parts of finely divided aluminum nitride are milled together and the dry powder recovered as in Example 16. This powder contains about 7 parts by volume titanium nitride and about 2 parts by volume aluminum nitride per part by volume of cobalt.

Twenty-two parts of this powder are hot pressed and the resulting disc cut up and tested as in Example 16. The average value of the transverse rupture strength is 124,000 p.s.i., the Rockwell A hardness 91.6, and the density is 5.75 g./cc.

After 3 minutes cutting time under the A conditions specified in Example 17, the cutting tool insert fashioned from this disc showed a flank wear of 16 mils and a crater depth of 1 mil.

Example 18

Ninety-six and three-tenths parts of finely divided titanium nitride, 27.0 parts of finely divided aluminum nitride, and 26.7 parts of a finely divided metal alloy the composition of which is 90 percent nickel and 10 percent molybdenum are placed in a ballmill and milled as in Example 16, except that the milling time is 136 hours. The resulting mixture is then washed free of oil, and dried as in Example 16. The powder contains about 6 parts by volume titanium nitride and about 3 parts by volume aluminum nitride per part by volume of metal.

Twenty-five parts of this powder is placed in a carbon mold and hot pressed as in Example 16, except that the temperature is increased to 1400° C. and a pressure of 4000 p.s.i. applied. While maintaining this pressure the temperature of the carbon mold is then raised to 1800° C. and the sample is maintained at this temperature for 2 minutes, after which the power is shut off and the sample removed from the furnace cavity.

The resulting disc is cut up and tested as in Example 16. The average transverse rupture strength is 183,000 p.s.i., the Rockwell A hardness is 91.3 and the density is 5.66 g./cc.

A standard cutting tool insert is fashioned from part of this disc and tested on a high speed lathe under the A conditions specified in Example 16. After 3 minutes cutting time the flank wear on this insert is only 6 mils and the crater depth is 0.75 mil. In addition, the insert is tested under a different set of conditions which are referred to as the B conditions: depth of cut is 1/16", feed is 0.020" and the speed is about 300 surface feet per minute. The material being cut is again 4340 steel. After 40 minutes cutting time under the B conditions the insert shows a flank wear of 4 mils and a crater depth of 1.5 mils.

Example 19

One hundred and twenty parts of finely divided titanium nitride, 22 parts of finely divided aluminum nitride, 31 parts of finely divided cobalt and 27 parts of finely divided tungsten carbide are ballmilled together as in Example 16 with the exception that the milling time is 99 hours.

The mixture is transferred from the ballmill to a resin kettle under a nitrogen atmosphere and the solids are allowed to settle. Most of the oil is then removed by decantation and the remaining oil is removed by vacuum distillation. The resulting powder contains about 6.4 parts by volume titanium nitride, about 2.1 parts by volume aluminum nitride and about 0.5 part by volume tungsten carbide per part by volume of cobalt.

Twenty-five parts of this powder is placed in a carbon mold and hot pressed as in Example 16 except that the temperature is first increased to 1850° C. and maintained for 11 minutes. A pressure of 4000 p.s.i. is then applied and the sample maintained under this pressure at 1850° C. for 2 minutes.

The resulting disc is cut for testing as in Example 16. The average transverse rupture strength is 176,000 p.s.i., the Rockwell A hardness is 90.8, and the density is 5.26 g./cc. A standard cutting tool insert is fashioned from part of the disc and is tested under the A conditions of Example 16 on a high speed lathe. After 3 minutes cutting time the flank wear on this insert is 6 mils and the crater depth is 0.75 mil. The insert is also tested under the B conditions shown in Example 18. After 15 minutes cutting time under the B conditions the flank wear on the insert is 4 mils and the crater depth is 0.5 mil.

In addition, the insert is tested under the following conditions: The speed is about 370 surface feet per minute, the depth of cut is 1/8" and the feed is 0.030". The material being cut is 4340 steel. These conditions are referred to as the C conditions. After 1 minute cutting time under the C conditions the flank wear on the insert is found to be 4 mils and no crater is formed.

Example 20

Ninety-one parts of finely divided titanium nitride, 16.6 parts of finely divided aluminum nitride, 67.2 parts of finely divided tungsten carbide and 25.4 parts of finely divided cobalt are ballmilled together, and recovered as a dry powder as in Example 19. The resulting powder contains about 5.6 parts by volume titanium nitride, 1.9 parts by volume aluminum nitride, and 1.5 parts by volume tungsten carbide per parts by volume of cobalt.

Twenty-five parts of this powder is hot pressed and the resulting disc cut up and tested as in Example 19. The Rockwell A hardness is 92.1 and the density is 6.77 g./cc. The cutting tool insert fashioned from this disc is tested under the A conditions shown in Example 16. After 3 minutes cutting time the flank wear is 8 mils and the crater depth is 1.5 mils. This insert is tested under the B conditions specified in Example 18. After 15 minutes cutting time the flank wear on this insert is 4 mils and the crater depth is 1.5 mils. The insert is also tested under the C conditions shown in Example 19. After 1 minute cutting time under the C conditions the flank wear is only 4 mils and the creater depth is 1 mil.

Example 21

Finely divived titanium nitride, aluminum nitride, tungsten carbide and cobalt are ballmilled together as in Example 20 in the following quantities: 120.9 parts of titanium nitride, 22.5 parts of aluminum nitride, 99.9 parts of tungsten carbide and 56.7 parts of cobalt. The product is separated from the oil as in Example 16, The powder composition contains about 3.5 parts by volume titanium nitride, 1.2 parts by volume of aluminum nitride, and 1 part by volume tungsten carbide per part by volume of cobalt.

Thirty parts of this powder is hot pressed as in Example 16, except that the temperature is first raised to 1850° C. and maintained at this temperature for 5 minutes. The temperature is then lowered to 1750° C. and a pressure of 4000 p.s.i. is applied. The sample is maintained under these conditions for 2 minutes, after which power is shut off and the carbon mold removed from the furnace cavity.

The resulting disc is cut up and its physical properties are measured as in Example 16. The average transverse rupture strength observed is 145,000 p.s.i., the Rockwell A hardness is 92.0 and the density is 5.83 g./cc.

A standard cutting tool insert fashioned from a portion of the disc is tested under the A conditions shown in Example 16, on a high speed lathe. After 3 minutes cutting time the wear on the flank of this tool is 4 mils and the crater depth is 0.5 mil. The insert is also tested under the B conditions shown in Example 18. After 15 minutes cutting time the flank wear is 3 mils and the crater depth is 0.5 mil. Tested under the C conditions of Example 19, the insert shows a flank wear of 2 mils and no crater wear after 1 minute cutting time.

Example 22

One hundred and three parts of finely divided titanium nitride, 19.3 parts of finely divided aluminum nitride, 49.6 parts of finely divided tungsten carbide and 28.1 parts of finely divided cobalt are ballmilled as in Example 16, except that the milling time is 90 hours. The product is separated from the oil by vacuum distillation. The product contains about 6 parts by volume titanium nitride, 2 parts by volume aluminum nitride, and 1 part by volume tungsten carbide per part by volume of cobalt.

Twenty-five parts of the resulting powder is loaded to a carbon mold and hot pressed as in Example 16, except that the temperature is first raised to 1000° C. and maintained at this temperature for 3 minutes. The temperature is then raised to 1850° C. and the sample maintained at this temperature for 5 minutes. A pressure of 4000 p.s.i. is then applied and the sample is held under this pressure at 1850° C. for an additional 2 minutes, after which power is shut off and the sample removed from the furnace cavity.

The resulting disc is cut up for testing as in Example 16. The average transverse rupture strength is 201,000 p.s.i., the Rockwell A hardness is 91.3 and the density is 5.98 g./cc.

A standard cutting tool insert fashioned from a portion of this disc and is tested on 4340 steel on a high speed lathe under A conditions specified in Example 16. After 3 minutes cutting time, the flank wear on the insert is 6 mils and the crater depth is 1 mil. When tested under C conditions specified in Example 19, after 1 minute cutting time the flank wear is 2 mils and the crater depth is 0.5 mil.

Example 23

A steel ballmill is loaded with 76 parts of a finely divided titanium nitride powder, 13 parts of a finely divided aluminum nitride powder, 10 parts of finely powdered molybdenum metal, and 8.6 parts of finely divided nickel metal. 5,990 parts of 6% cobalt bonded tungsten carbide rod inserts of Example 16 are also placed in the mill, along with 259 parts of a high boiling hydrocarbon oil having a flash point of 130° C. The titanium nitride powder has a crystallite size of 700 millimicrons as determined by nitrogen surface area, and contains 21% nitrogen and 1.15% oxygen. The nickel powder has a size of 1.3 microns as determined by nitrogen surface area and an X-ray crystallite size as determined by X-ray line broadening of 160 millimicrons. The molybdenum is also very fine, having a surface area of 1.3 m.²/g. and an X-ray crystallite size of 79 millimicrons.

The above mixture is ballmilled on rubber-lined rollers at 85 r.p.m. for 5 days. Recovery of the product is effected by transferring the slurry from the ballmill into a resin kettle, allowing the slurry to settle out from the hydrocarbon oil, and siphoning off the supernatant liquid. The wet cake is then dried under a vacuum of 0.5 mm. of mercury, at about 250° C. When dry, the resin kettle is opened to an inert atmosphere within a nitrogen-filled dry box and the product is screened through a 70 mesh screen (U.S. Sieve Size). Chemical analysis and weighing of the balls and the mill indicate that 4.2 parts of the tungsten carbide ball material and 3.5 parts of iron from the steel mill have been incorporated into the product in the form of a finely divided powder. The volume composition of this powder is 67.6% titanium nitride, 19.3% aluminum nitride, 5.0 molybdenum, 4.7% nickel, 1.4% tungsten carbide, and 2.2% iron.

Since the solubility of molybdenum in the nickel-iron alloy phase is approximately 25%, this composition represents one in which the total metal phase comprising molybdenum, nickel, and iron consists of 70% by volume of a ductile single phase alloy of iron, nickel and molybdenum with a 30% by volume excess beyond the solubility limit at 600° C. of additional molybdenum metal.

This composition is inserted into a graphite mold with graphite plungers capping the ends, and is raised to a temperature of 1600° C. in an induction furnace using a 45 kilowatt power input. The time required to heat the sample to 1600° C. is 8 minutes and it is allowed to sinter in the mold for a period of 3 minutes after reaching temperature. A pressure of 4000 pounds per square inch is then imposed for a period of 4 minutes, and the resulting dense, hot pressed composition is ejected from the hot zone.

This refractory interdispersion is then cut with a diamond saw to give specimens for testing transverse rupture strength, hardness on the Rockwell A scale, and a section is machined in the form of a metal cutting tool insert having the dimensions ½" x ½" x ⅜₁₆". The transverse rupture strength of this material is found to be 220,000 p.s.i., and when used to turn 4340 steel having a Brinnell hardness of 330 at a speed of 575 surface feet per minute, a feed of .02 inch per revolution and a depth of cut of 0.05", the tool performs in an outstanding fashion for a period in excess of 3.5 minutes.

Example 24

Ninety-seven and eight tenths parts of the titanium nitride of the previous example and 24 parts of a finely divided alpha alumina having a crystallite size of approximately ½ micron are loaded into a mill as described in the previous example, along with 28.8 parts of molybdenum, 28.2 parts of nickel, 5,890 parts of tungsten carbide cobalt inserts and 235 parts of a highly boiling hydrocarbon oil. After milling in a fashion identical to that described in the last example, for a period of 5 days, it is found that the composition has picked up a contamination of 2.1 parts of tungsten carbide from the inserts and 2.2 parts of iron from the mill. Recovery and preparation of the powder proceeds as in the previous example, and the final volume composition is determined to be 59.2% titanium nitride, 19.7% Al₂O₃, 9.0% molybdenum, 10.6% nickel, 0.9% iron, and 0.5% tungsten carbide. As in the previous example, the metal phase consists of approximately 70% by volume of a ductile, single phase nickel-molybdenum-iron alloy with somewhat less than 30% by volume in excess of this solubility limit of additional molybdenum metal. This interdispersion is pressed as in the previous example, with the exception that the pressure of 4000 p.s.i. is only applied for a period of 1 minute. The pressed composition has a transverse rupture strength of 83,000 p.s.i., a Rockwell A hardness of 90.3, and also is an excellent cutting tool. For example, at a cutting speed of 500 s.f./m., a feed of 0.02 i.p.r., and 0.05" depth of cut, it exhibits a flank wear of only 0.5 mil and a crater wear of 8 mils after one minute of cutting under these conditions.

Example 25

Eighty-eight parts of the aluminum nitride of Example 23, 15.9 parts of the molybdenum, and 12.9 parts of the nickel of Example 23 are placed in a ballmill with 6,050 parts of the tungsten carbide-cobalt rod inserts and 260 parts of the hydrocarbon oil. After a milling period of 5 days, the contamination levels are 6.5 parts of tungsten carbide from the rod inserts, and 1.2 parts of iron. This composition is recovered and hot pressed as in Example 23, except that the temperature employed is 1800° C., and this requires 11 minutes to heat up. It is sintered at this temperature in the carbon mold for a period of 3 minutes, and is then hot pressed under a pressure of 4000 p.s.i. for a period of 4 minutes after which it is ejected from the mold. The transverse rupture strength is 108,000 p.s.i., Rockwell A hardness is 89.6, and final chemical volume composition 88.3% aluminum nitride, 5.0% molybdenum, 4.8% nickel, 1.4% tungsten carbide, and 0.5% iron.

This is an excellent cutting tool on steel, and under the conditions of 3 minutes of cutting at 590 s.f./m., a feed of 0.01 IRP, and 0.05" depth of cut, it shows a flank wear of only 6 mils and a crater depth of only ½ mil. This composition can be used to machine 4340 steel of the hardness noted above, even at a speed of 1520 s.f./m., and 0.05 i.p.r. feed. Under these conditions, the flank wear is only 6 mils, and the crater depth only ½ mil after a minute of cutting operation. In addition this tool gives an excellent surface finish to the steel.

Example 26

A composition is prepared using the materials described in Example 23, and using the same process in all respects. It has a final volume composition of 70% titanium nitride, 20% aluminum nitride, and 10% of a nickel-molybdenum alloy, 70% of which is a ductile, solid solution of molybdenum and nickel, and 30% of which is molybdenum in excess of the solid solubility limit in nickel at 600° C. After hot pressing as in Example 23, this composition has a transverse rupture strength of 154,000 p.s.i., a Rockwell A hardness of 91.7, and is an excellent cutting tool on 4340 steel under conditions where conventional titanium carbide-based or tungsten carbide tools would not perform satisfactorily at all.

Example 27

A composition is prepared in an identical fashion to that described above, having the volume composition of 50% titanium nitride, 5% aluminum nitride, and 15% Al₂O₃, with 30% of a metal phase which is 68% by volume nickel and 32% by volume tungsten. This is approximately the solid solubility limit for tungsten in nickel at 600° C., as shown by the phase diagram. The transverse rupture strength of this material is 123,000 p.s.i. after pressing at 1600° C. under a pressure of 4000 p.s.i., as previously described. This interdispersion is also an excellent cutting tool on steel and shows low wear under conditions of 590 s.f./m., 0.01 i.p.r. feed, and 0.05 depth of cut.

Example 28

Sixty parts of a finely divided tantalum nitride powder having a crystallite size of about 0.3 micron, determined by X-ray line broadening measurements, and 0.8 part of a finely divided purse iron powder having a particle size of about 44 microns, are loaded into a rubber-lined steel ballmill filled to 40% of its volume with 3/16 inch steel balls and containing 260 parts of a high boiling hydrocarbon oil having a flash point of 185° F. This mill is put on rubber-lined rollers and rotated at a speed of 60 revolutions per minute for a period of 24 hours. The powder is recovered from the mill and separated from the bulk of the hydrocarbon oil by decantation. Hexane is then used to wash the residual oil out of the powder, with the washings being accomplished by decantation. After six washes with hexane, the resulting oil-free dispersion is dried in a vaccum oven. Chemical analysis shows it to contain about 43.6 parts by volume of tantalum nitride per part by volume of iron.

The interdispersion is placed in the cavity of a cylindrical carbon mold which can be inserted in the hot zone of an induction furnace coil and held there by two carbon rams which are in turn connected to the platens of a hydraulic press. The mold and rams are enclosed through vacuum-tight seals within a water-cooled cylindrical steel shell which is evacuated by a vacuum pump. Temperature control of this equipment is effected by means of a radiation pyrometer, the output of which operates a controller, which inturn controls the power supply to the induction furnace. After evacuation of the furnace, the temperature of the carbon mold is increased to 1600° C., and a pressure of 200 pounds per square inch applied. The temperature of the furnace is raised to 1700° C., at which point the pressure is increased to 4000 pounds per square inch, the temperature is again raised to 1800° C., maintaining the pressure of 4000 p.s.i., and the sample is held at this temperature for 5 minutes, after which the power is cut off and the sample removed from the furnace cavity.

The resulting refractory interdispersion of the invention displays good transverse rupture strength and high hardness.

When this refractory interdispersion is fashioned into a standard cutting tool insert, it is found to be effective in cutting steel on a high speed lathe.

Example 29

Fifty-five and eight-tenths parts of the tantalum nitride of Example 28, 1.2 parts of 1 micron carbonyl nickel powder, and 0.2 part of −325 mesh pure molybdenum powder are placed in a rubber-lined steel ballmill along with 260 parts of a high boiling hydrocarbon oil. To this are added 2500 parts of the tungsten carbide-cobalt rod inserts described in Example 16. This mill is rotated for a period of 24 hours and the resulting mixture of nickel-molybdenum-tantalum nitride and tungsten carbide-cobalt obtained by wear of the rod inserts is recovered from the mill and separated from the oil as is described in previous examples.

Chemical analysis shows this product to consist of about 25.3 parts by volume of tantalum nitride with a trace of tungsten carbide per part by volume of a metal which is a complex alloy of cobalt, nickel and molybdenum.

Fifteen parts of this material is loaded into the cylindrical carbon mold and is inserted into the press under a pressure of 200 pounds per square inch at a temperature of 1550° C.; at 1700° C., a pressure of 4000 pounds per square inch is imposed and the sample is maintained under this pressure while the temperature is raised to 1800° C. and held at this point for 5 minutes. The sample is then removed from the hot zone of the furnace and cooled.

The resulting refractory interdispersion is found to have good transverse bending strength, high hardness and is useful in cutting steel.

Example 30

This example concerns the preparation of a refractory interdispersion of iron in which tantalum nitride and titania are interdispersed.

Fifty-seven patrs of the tantalum nitride of Example 28, 1 part of a pigment-grade, approximately 1 micron aggregate size, titanium dioxide, and 260 parts of a high boiling hydrocarbon solvent are loaded into a rubber-lined steel ballmill which is filled with 2200 parts of 3/16 inch diameter steel balls. The mill is rotated for 24 hours at a speed of 60 revolutions per minute, during which time the titanium nitride, the titania, and an appreciable quantity of steel obtained by attrition of the steel balls, forms an intimate, finely divided, powder mixture. This is recovered from the hydrocarbon oil solvent, washed with hexane, and dried as described in previous examples.

Chemical analysis shows it to contain about 13.8 parts by volume of tantalum nitride and about 0.9 part by volume of titanium dioxide per part by volume of iron.

Fifteen parts of this powder interdispersion are loaded into a cylindrical carbon mold, and inserted into the hot zone of a vacuum hot press as described in Example 28, at a temperature of 1550° C., under an initial pressure of 200 pounds per square inch. The temperature of the furnace is then increased to 1700° C., at which point the pressure is also increased to 4000 pounds per square inch. This pressure is maintained while the temperature is raised to 1800° C. and the sample held at this temperature for 5 minutes, after which the powder is turned off and the sample removed from the hot press.

The resulting pressed body displays a high transverse rupture strength and high hardness. This material is also found to be useful as a cutting tool for cast iron.

Example 31

Fifty-five and eight-tenths parts of the tantalum nitride powder of Example 28, and 1.4 parts of 1 micron particle size nickel powder are loaded into rubber-lined steel ballmill, with 260 parts of a high boiling hydrocarbon solvent, and 2200 parts of 3/16 inch diameter steel balls. This material is milled for 48 hours, after which the finely divided intimate interdispersion of tantalum nitride, nickel, and iron from the attrition of the steel balls is recovered from the hydrocarbon solvent, washed, and dried as described in previous examples.

Chemical analysis shows this material to contain about 5.7 parts by volume tantalum nitride per part by volume of a metal which is about 71.4 weight percent iron and 28.6 weight percent nickel.

This is inserted into a vacuum hot press as described in Example 28 at a temperature of of 1550° C., using a pressure of 200 pounds per square inch. The temperature is increased to 1700 C., at which point a pressure of 4000 pounds per square inch is applied, and this is maintained while the temperature is raised to 1800° C. and the sample held for 5 minutes at this temperature. The sample is then removed from the hot zone and cooled to room temperature.

This sample has good transverse rupture strength and high hardness. It is also found useful in performing cutting operations on steel.

Example 32

This example describes the preparation of a composition containing 4 parts by volume of a particulate phase of tantalum nitride and zirconium nitride, each nitride constituting 50% by volume of the particulate phase, interdispersed in a metal matrix of a cobalt-iron alloy with each metal constituting 50% by volume of the alloy.

Sixty-five and one tenth parts of the tantalum nitride of Example 28, 28.3 parts of a 40 millimicron nitride powder, 6.06 parts of —325 mesh iron powder, and 8.90 parts of a cobalt metal powder produced by the decomposition of cobalt carbonyl having a particle size of about one micron, are loaded into a rubber-lined steel mill which contains 2200 parts of 3/16 inch diameter steel balls and 260 parts of a high boiling hydrocarbon solvent. The mill is rotated at a speed of 60 revolutions per minute for a period of 24 hours, after which the intimately mixed powders of tantalum nitride, zirconium nitride, iron and cobalt are separated from the steel balls and washed free of oil as described in previous examples.

Twenty-five parts of this composition are hot pressed at a temperature of 1800° C. under 4000 pounds per square inch pressure, the pressure being first applied at 1400° C. The time of pressing at 1800° C. is five minutes.

The resulting refractory interdispersion of this invention is found to be useful as a cutting tool on steel and has high hardness and good transverse rupture strength.

Example 33

Ninety-three and a half parts of the tantalum nitride of Example 28 are mixed with 34.2 parts of an 80 weight percent nickel, 18 weight percent chromium, 2% thoria alloy powder. This metal powder consists of a nickel-chromium alloy and dispersed uniformly throughout each metal powder particle is 2% of approximately 30 millimicron crystals of colloidal thoria. These metal-thoria and tantalum nitride powders are milled as described in previous examples, and recovered from the oil in the same fashion. This dispersion contains about 1.5 parts by volume of tantalum nitride per part by volume of nickel-chromium thoria.

The resulting intimate interdispersion of tantalum nitride and nichrome-thoria alloy is cold pressed at a pressure of 10 tons per square inch and sintered in a furnace having an atmosphere of pure hydrogen for 3 hours at a temperature of 1150° C. This sample is cooled down and inserted in a can of stainless steel which is then evacuated and sealed. This can is heated to a temperature of 2300° F. and almost instantly inserted into an extrusion guide in a high pressure hydraulic press. Sufficient pressure (about 100,000 pounds per square inch) is applied to extrude the can, and the Nichrome-thoria interdispersed with tantalum nitride with a reduction ratio of 8 to 1.

This refractory is useful as a high temperature heating element, having high strength and oxidation resistance, as well as a high electrical resistance.

It is also very useful as a high temperature structural material and a high temperature erosion and corrosion resistant refractory for temperatures as high as 1100° C.

Example 34

One hundred twenty-six and three-tenths parts of the tantalum nitride of Example 28 and 2.28 parts of a 10 micron size iron chromium alloy having 80% iron to 20% chromium, are loaded into a rubber-lined steelballmill, along with 2600 parts of stainless steel balls, and 260 parts of a high boiling hydrocarbon solvent. This composition is milled for 24 hours, and the resulting finely divided powder recovered as described in previous examples. Chemical analysis shows the composition to contain about 25.87 parts by volume of tantalum nitride per part by volume of a metal which is an 80–20 iron-chromium alloy.

Twenty parts of this material are pressed in the hot press as described in Example 28, with the sample being inserted at a temperature of 1000° C., 4000 pounds pressure applied, the temperature raised to 1800° C., while the sample is maintained under 4000 pounds pressure, and held at this temperature for 5 minutes.

This refractory interdispersion has high hardness and good transverse rupture strength. It is also useful as a cutting tool on ferrous metals and alloys.

Example 35

Sixty-two and a half parts of 0.5 micron-sized tungsten carbide and 95.7 parts of the tantalum nitride of Example 28 are blended with 7.7 parts of 1 micron size carbonyl nickel and 2.36 parts of finely divided molybdenum metal in a rubber-lined steel ballmill containing 260 parts of a high boiling hydrocarbon solvent and filled to 40% of its volume with 1/4 inch diameter nickel shot. This composition is milled for 48 hours, after which it is recovered from the mill and washed free of oil as described in previous examples.

Chemical analysis shows the final composition to contain 5.4 parts by volume of tantalum nitride and 3.6 parts by volume of tungsten carbide per part by volume of metal which is 85% nickel and 15% molybdenum by weight.

Forty parts of this interdispersion are pressed in a hot press as described in Example 28, with an initial application of pressure of 4000 pounds per square inch at a temperature of 1000° C., maintaining this pressure to a temperature of 1800° C., holding at this temperature for 5 minutes, and then removing the hot pressed sample from the furnace region.

This refractory interdispersion performs well as a cutting tool on steel, cast iron, and both cobalt and nickel-based superalloys.

Example 36

One hundred forty-seven parts of tantalum nitride and 8.4 parts of a mixture of less than 10 micron size powders of nickel, chromium and iron in the ratios of 75% nickel, 18% chromium, and 7% iron, are milled using tungsten carbide-cobalt rod inserts of Example 16, in a rubber-lined steel ballmill containing 260 parts of a high boiling hydrocarbon oil. Milling is continued for a period of 3 days, after which the resulting finely divided powder dispersion is recovered as described in previous examples.

Sixty parts of this powder dispersion are pressed under a pressure of 4000 pounds per square inch, initially applied at 1000° C., and maintained while the temperature of the sample is raised to 1800° C. and held at this temperature for 5 minutes. The sample is then ejected from the hot press, cooled and tested.

It has a transverse rupture strength of 110,000 pounds per square inch, an impact strength of 20 foot pounds per square inch, and a Rockwell A hardness of 88.0. Its density is 15.54 grams per cubic centimeter, which is approximately the theoretical density to be expected of this composition.

Example 37

One hundred seventeen and three-tenths parts of the tantalum nitride of Example 28 are mixed with 11.8 parts of titanium carbide, having a particle size of approximately 1 micron, and 3.65 parts of a mixture of nickel and molybdenum metal powders in the weight ratio of 80 parts of nickel to 20 parts of molybdenum. This is milled as described for previous examples, with the milling time being 24 hours. It is recovered from the mill and separated from residual oil as previously described.

This material is hot pressed at a temperature of 1900° C. for a holding time of 5 minutes under a pressure of 4000 pounds per square inch. The pressure is initially applied at a temperature of 1000° C.

The resulting refractory interdispersion of the invention contains 18 parts by volume of tantalum nitride and 6 parts by volume of titanium carbide per part by volume of an alloy which has an 80–20 weight ratio of nickel to molybdenum.

Example 38

Eighty-seven and nine-tenths parts of the tantalum nitride of Example 28 are loaded into a rubber-lined steel ballmill along with 56.4 parts of 1 micron particle size tungsten carbide and 8.9 parts of 1 micron particle size cobalt metal powder. Also placed in the mill is 260 parts of high boiling hydrocarbon oil and 2600 parts of the tungsten carbide-cobalt rods described in Example 16. Milling is continued at a speed of 60 revolutions per minute for a period of 3 days after which the powder is recovered from the rods and purified from the oil as described in previous examples. This material is hot pressed at a temperature of 1700° C., with a hold time of 5 minutes at this temperature, under a pressure of 4000 pounds per square inch. This pressure is first applied at 1000° C. The resulting refractory interdispersion of the invention consists of 6 parts by volume of tantalum nitride and 4 parts by volume of tungsten carbide per part by volume of cobalt.

This refractory interdispersion possesses both high hardness and high transverse rupture strength and performs well as a cutting tool on steel, cast iron, and ferrous alloys.

Example 39

One hundred forty-three and four-tenths parts of the tantalum nitride of Example 28, 4.26 parts of a pigments grade rutile titanium dioxide, and 0.99 part of a mixture of cobalt, chromium, and tungsten metal powders in the weight ratio of 70 parts cobalt, 20 parts chromium, and 10 parts tungsten, all powders being less than 10 microns in particle size, are milled for 48 hours in a rubber-lined steel ballmill filled to 40% of its volume with the tungsten carbide-cobalt rods of Example 16, and also containing 260 parts of a high boiling hydrocarbon oil. Following the milling, the recovery of the intimately mixed powder of tantalum nitride, titanium dioxide, and the mixed metal powders is effected as described in previous examples. Twenty-five parts of this are loaded into a carbon mold and hot pressed at a temperature of 2000° C. under pressure of 6000 pounds per square inch with a holding time at the top temperature of 1 minute.

The resulting refractory interdispersion of the invention contains traces of tungsten carbide, 90 parts by volume tantalum nitride and 9 parts by volume titanium dioxide per part by volume of a metal alloy having the cobalt-chromium-tungsten weight ratio previously described.

This refractory is useful as a corrosion resistant, high temperature crucible material, particularly for handling molten nonferrous metals, and it is also a good cutting tool for operation at very high speeds on steel.

Example 40

Seventy-five and sixty-five one-hundredths parts of finely divided nickel metal powder of a particle size of about 1 micron, 15.3 parts of a similarly finely divided molybdenum metal powder of comparable particle size, 393.6 parts of 1 micron particle size titanium carbide, and 144 parts of the tantalum nitride of Example 28 are loaded in a ballmill filled to 30% of its capacity with cobalt-bonded tungsten carbide rod inserts, and this composition is ballmilled using a high boiling hydrocarbon oil sufficient in quantity to just cover the rods, for a period of five days in a mill at a speed of rotation of 60 revolutions per minute. This material is recovered from the mill, dried, and prepared for fabrication by hot pressing, as described in Example 28. It is hot pressed to its theoretical density of 6.29 grams per cubic centimeter, using a pressing time of 3 minutes, at a temperature of 1430° C. The resulting refractory dispersion of the invention consists of a continuous metal bonding phase comprising 10 volume per cent of the composition and composed of an 85% by weight nickel-15% by weight molybdenum, solid-solution alloy, and a ceramic phase containing 80 volume percent titanium carbide, and 10 volume percent tantalum nitride.

The transverse rupture strength of this composition is 167,000 pounds per square inch, its Rockwell A hardness is 90, and its impact strength is 30 foot pounds per square inch. This material is an excellent high speed cutting tool for cutting hardened steels, and shows substantially less tendency to weld and can be used at considerably higher speeds than corresponding tools which do not contain the tantalum nitride.

What is claimed is:

1. As a new article of manufacture a cutting tool comprising a cutting edge of a dense interdispersion consisting essentially of from 3 to 50 parts by volume of a refractory phase bonded with one part by volume of a binder metal selected from the group consisting of iron, cobalt, nickel and their alloys, said refractory phase consisting essentially of from 50 to 95 volume percent of an essential nitride selected from the group consisting of titanium nitride, zirconium nitride, hafnium nitride, niobium nitride, vanadium nitride and their mixtures, and from 5 to 50 volume percent of a wear-resistant additive selected from the group consisting of aluminum nitride, tantalum nitride, alumina and their mixture, said interdispersion having a density of at least 98 percent of its theoretical density, and the components having an average grain size of less than 10 microns.

References Cited

UNITED STATES PATENTS

| | | | |
|---|---|---|---|
| 3,409,416 | 11/1968 | Yates | 75—205 XR |
| 3,409,417 | 11/1968 | Yates | 29—182.5 |
| 3,409,418 | 11/1968 | Yates | 29—182.5 |
| 3,409,419 | 11/1968 | Yates | 75—205 XR |

BENJAMIN R. PADGETT, Primary Examiner

A. R. STEINER, Assistant Examiner

U.S. Cl. X.R.

75—205, 206